United States Patent [19]
Kozlik

[11] 3,901,906
[45] Aug. 26, 1975

[54] 2-(1-(2-FLUORO-4-BIPHENYLYL)ETHYL)-2-OXAZOLINE

[75] Inventor: Antonin Kozlik, Clifton Grove, England

[73] Assignee: The Boots Company Limited, Nottingham, England

[22] Filed: Aug. 21, 1972

[21] Appl. No.: 282,509

[30] Foreign Application Priority Data
Aug. 25, 1971 United Kingdom............... 39939/71

[52] U.S. Cl.... 260/307 F; 260/243 B; 260/247.5 R; 260/293.67; 260/296 R; 260/999
[51] Int. Cl.......................................... C07d 263/10
[58] Field of Search.... 260/243 B, 247.5 R, 293.67, 260/296 R, 307 F

[56] References Cited
UNITED STATES PATENTS

| | | | |
|---|---|---|---|
| 3,726,893 | 4/1973 | Chen et al. | 260/307 F |
| 3,737,408 | 6/1973 | Hunsucker | 260/47 CP |

OTHER PUBLICATIONS
Shirley, "Organic Chemistry," Holt, Rinehart and Winston, New York (1964), pp. 206–207.

*Primary Examiner*—G. Thomas Todd
*Attorney, Agent, or Firm*—Lawrence Rosen; E. Janet Berry

[57] ABSTRACT

Novel halo-oxazolines, processes of making them, processes of making oxazoline derivatives of aryl alkanoic acids and the acids themselves, as well as pharmaceutical compositions and uses of the acids and their oxazoline derivatives are described.

4 Claims, No Drawings

2-(1-(2-FLUORO-4-BIPHENYLYL)ETHYL)-2-OXAZOLINE

This invention relates to derivatives of oxazoline.

It is known that a large number of arylalkanoic acids possess anti-inflammatory activity and this invention relates to, inter alia, a method of preparing such acids, to novel intermediates therefor and to a method of preparing the intermediates.

According to the invention, there are provided compounds of formula I

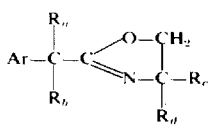

in which $R_a$ is hydrogen and $R_b$ is hydrogen or alkyl or $R_a$ and $R_b$ together are methylene;

$R_c$ and $R_d$ are the same or different and are alkyl or aryl or together with the carbon atom to which they are bonded form a carbocyclic ring and Ar is an aryl group.

These oxazoline derivatives are intermediates in the preparation of arylalkanoic acids having anti-inflammatory activity.

The Ar group is generally a substituted phenyl of formula

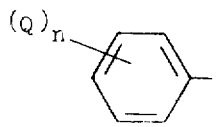

in which $n$ is an integer of 1 to 4, preferably 1 or 2, and Q is the same or different and is selected from alkyl, e.g., methyl, ethyl, propyl, butyl (especially isobutyl), pentyl, branched hexyl and heptyl; aralkyl e.g., benzyl; alkenyl e.g., allyl and propenyl; cycloalkyl e.g., $C_3$ to $C_7$, and especially cyclohexyl; alkyl substituted cycloalkyl; cycloalkenyl e.g., cyclohexenyl; alkoxy e.g., methoxy, isopropoxy, aralkoxy e.g. benzyloxy; alkenyloxy e.g. allyloxy and butenyloxy; cycloalkoxy e.g., cyclohexyloxy; cycloalkenyloxy; alkylthio e.g., propylthio and n-butylthio; aralkylthio; alkenylthio; cycloalkylthio; cycloalkenylthio; haloalkyl e.g., trifluoromethyl; halogen e.g., fluorine, chlorine and bromine; nitro, cyano, alkylamino, dialkylamino, substituted and unsubstituted pyridyl, piperidyl, furyl, morpholino, thiamorpholino, pyrrolinyl, pyrrolidinyl, pyrrolyl, thienyl, or two Q groups together form a carbocyclic or heterocyclic ring, which rings may be aromatic, or Q, when $n$ is 1, is

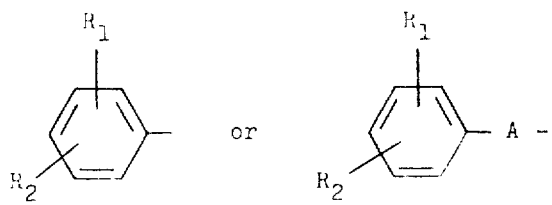

wherein A is —O—, —S—, —CO—, —CONH—, —NR$_3$— or —SO$_2$NR$_3$— in which R$_3$ is hydrogen or alkyl and R$_1$ and R$_2$ are the same or different and are hydrogen or have the meanings previously given for Q, e.g., alkyl, alkoxy or halogen.

A particularly suitable group of compounds are those in which the substituent, or one of the substituents, Q is in the 4-position, e.g., when Q is optionally substituted phenyl as described above, is alkyl, e.g., isobutyl, or cycloalkyl, e.g., cyclohexyl. Preferred compounds are those in which Ar is

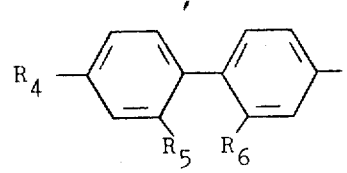

wherein $R_4$ is hydrogen, $R_5$ is hydrogen or fluorine and $R_6$ is fluorine, or wherein $R_4$, $R_5$, $R_6$ are individually selected from fluorine, chlorine and bromine, preferably at least two of $R_4$, $R_5$ and $R_6$ being fluorine and the third either fluorine or chlorine.

Examples of carbocyclic groups that may be formed by two Q groups include benzo groups which may also be substituted. Heterocyclic groups include, for example, benzothiazino, which may also be substituted.

The preferred value of $R_b$ is hydrogen or $C_{1-7}$ alkyl, preferably methyl.

The groups $R_c$ and $R_d$ are preferably $C_{1-7}$ alkyl, e.g., methyl or ethyl. Generally they are both methyl but they may be, for example, both ethyl or one methyl and one ethyl. They can also be aryl, usually phenyl or substituted phenyl.

Typical of suitable substituted phenyl groups are those defined and listed above for Ar. If $R_c$ and $R_d$ form a carbocyclic ring with the carbon atom to which they are attached it usually has 4 to 10, preferably 5 to 8 and most preferably 5 to 7 ring carbon atoms, e.g., cyclohexyl.

A particularly preferred group of compounds are those compounds of formula II

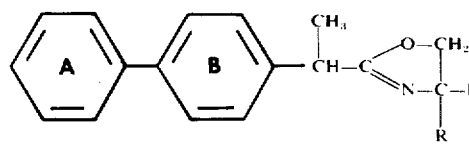

in which R is alkyl and each of the rings A and B may optionally contain one or more substituents.

Generally at least ring B is substituted and typical substituents are selected from fluorine, chlorine, bromine, alkyl and alkoxy of up to seven carbon atoms. R is generally methyl.

Examples of typical compounds of the invention are the 4,4-dimethyl-2-oxazolines described hereinafter in the examples as well as the following.

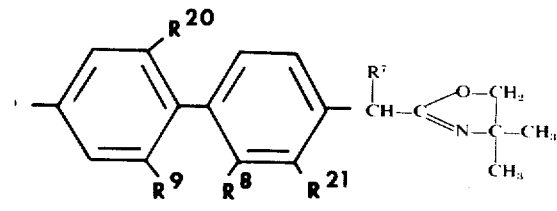

| R⁷ | R⁸ | R⁹ | R¹⁰ | R²⁰ | R²¹ |
|---|---|---|---|---|---|
| CH₃ | F | F | F | H | H |
| CH₃ | F | F | Cl | H | H |
| CH₃ | F | Cl | F | H | H |
| CH₃ | Cl | F | F | H | H |
| CH₃ | H | F | H | F | H |
| CH₃ | F | H | Cl | H | H |
| CH₃ | Cl | F | H | H | H |
| CH₃ | MeO | F | H | H | H |
| CH₃ | H | H | H | H | F |
| CH₃ | H | Me | H | H | H |
| CH₃ | H | Br | H | H | H |
| CH₃ | MeS | H | H | H | H |
| CH₃ | Et | H | H | H | H |
| CH₃ | CF₃ | H | H | H | H |
| CH₃ | NO₂ | H | H | H | H |
| H | Me | H | H | H | H |
| H | MeO | H | H | H | H |
| H | F | F | H | H | H |
| H | F | H | F | H | H |
| H | H | F | F | H | H |
| H | F | F | Cl | H | H |
| H | F | Cl | F | H | H |
| H | Cl | F | F | H | H |
| H | F | F | F | H | H |

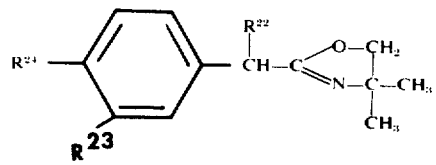

| R²² | R²³ | R²⁴ |
|---|---|---|
| H | H | 2-fluorophenoxy |
| H | F | phenoxy |
| H | H | phenoxy |
| H | phenoxy | H |
| H | H | cyclohexyl |
| H | Cl | cyclohexyl |
| H | H | t-butyl |
| H | H | butoxy |
| H | chloro | allyloxy |
| CH₃ | phenoxy | H |
| CH₃ | F | phenoxy |
| CH₃ | H | anilino |
| CH₃ | H | 2-fluoroanilino |
| CH₃ | H | 2-chlorophenoxy |
| CH₃ | Cl | allyloxy |
| CH₃ | H | benzoyl |
| CH₃ | benzoyl | H |
| CH₃ | cyclohexyl | H |
| CH₃ | fluoro | N-pyrrolyl |
| CH₃ | H | N-pyrrolyl |
| CH₃ | H | isopropoxy |
| CH₃ | H | cyclopentyl |
| CH₃ | F | isobutyl |
| CH₃ | Cl | isobutyl |
| CH₃ | H | t-butyl |

In all the specifically disclosed compounds one or more methyl groups may be replaced by ethyl. Examples of such compounds include 2-[1-(2-fluoro-4-phenylyl)ethyl]-4,4-diethyl-2-oxazoline and 2-[1-(2-fluoro-4-biphenylyl)ethyl]-4-ethyl-4-methyl-2-oxazoline.

The invention also provides a process for the preparation of the oxazoline derivatives which comprises reacting a compound of formula III ArMgX          III with a compound of formula IV

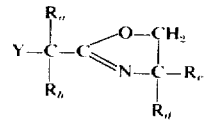

in which X and Y are the same or different and are selected from iodine, bromine and chlorine, and in which Ar, $R_a$, $R_b$, $R_c$ and $R_d$ are as defined herein, or b. reacting a compound of formula Ar-Li with a compound of formula IV as defined above, or c. reacting a compound of formula Ar-Y with a compound of formula

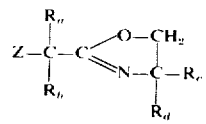

wherein Z is Li or MgX and X, Y, Ar, $R_a$, $R_b$, $R_c$, $R_d$ and Ar are as defined above, d. reacting a compound of formula

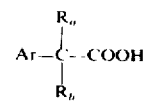

with aminoalcohol of the formula

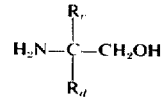

wherein Ar, $R_a$, $R_b$, $R_c$ and $R_d$ are as defined above, or e. alkylating a compound of formula I in which $R_b$ is hydrogen to form a compound of formula I in which $R_b$ is alkyl.

We are unaware of any process ever having been proposed that corresponds to or resembles process (a) above and we find surprisingly that that process can easily be operated to give good yields.

In some cases when carrying out the preparation of the oxazoline derivatives, especially by process (a) above, yields obtained are higher when on the carbon carrying the halogen in compound IV there are two hydrogen atoms. Thus when it is desired to obtain a compound of formula I in which $R_b$ is alkyl it may be desirable to alkylate a compound of formula I in which $R_b$ is hydrogen. This may be carried out, for example, by treating the compound of formula I with a lithium alkyl compound and then with a compound $R_bZ$ in which $R_b$ is the desired lower alkyl and Z is chlorine, bromine or iodine. Suitably the lithium alkyl may be lithium butyl and $R_bZ$ is generally methyl iodide.

The particularly preferred compounds may most advantageously be prepared by reacting a compound of formula V

with a compound of formula VI

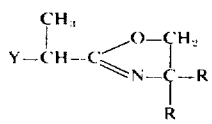

in which X and Y are the same or different and are selected from iodine, bromine and chlorine and in which

and R are as defined.

The reaction for producing the oxazoline derivative by process (a) is generally carried out in an aprotic medium, preferably an ether, for example tetrahydrofuran, diethyl ether or a mixture of these. The reaction is generally carried out at a temperature of −20°C. to +100°C., preferably −10°C. to 70°C. In some cases a catalyst may advantageously be employed, for example in an amount of 0.01 to 1 molar per cent of the magnesium compound. It is preferable that the catalyst is one which is soluble in the reaction medium. Suitable catalysts include transition metal compounds, for example compounds (especially complexes) of silver, copper or iron.

Similar conditions may also be used for processes (b) and (c). For process (d) similar solvents and temperatures can be used, but the temperature is preferably −10° to +20°C.

The invention also provides a process for obtaining acids of formula VII

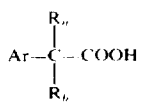

or an ester thereof in which Ar, $R_a$ and $R_b$ are as previously defined which comprises subjecting to hydrolysis or alcoholysis an oxazoline derivative described above.

Hydroylsis may be carried out by a conventional method, e.g., by the use of an acid or an alkali in water, in an organic reaction medium or in a mixture thereof. The temperature may be, for example, 15° to 150°C. Preferably the hydrolysis is conducted by refluxing in the presence of an alkali metal hydroxide or a mineral acid in the presence of a lower alkanol.

Acids of formula VIII

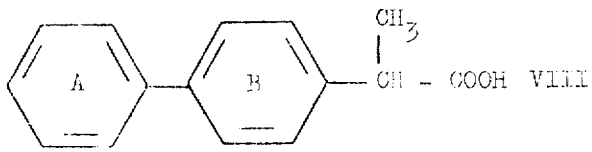

or an ester thereof in which

are previously defined, may thus be obtained by hydrolysis or alcoholysis of the corresponding oxazoline derivative. The acids may optionally be converted to a pharmaceutically acceptable salt or if desired into an amide or other active derivative.

The oxazoline derivatives disclosed herein, as well as being useful as intermediates in the preparation of the arylalkanoic acids and their derivatives, also possess anti-inflammatory activity as well as analgesic and antipyretic activity.

The therapeutic activity of the compounds is assessed in various species and compared with the activity of aspirin.

For example the anti-inflammatory activity is determined in the test described by Adams and Cobb, *Nature*, 1958, 181, 773. The activity of the test compounds is compared with that of aspirin against ultraviolet light induced erythema on the depilated skin of guinea pigs.

The analgesic activity of the compounds is determined in the rat using a modification of the technique described by Randall and Selitto, *Arch. int. Pharmacodyn*, 1957, 111, 409. In this technique the analgesic effect of the drugs is compared with aspirin by determining the increase in pain threshold when pressure is applied to the inflamed foot.

The anti-pyretic effect is determined in rats in which the body temperature has been raised by a subcutaneous injection of a yeast suspension. Comparison of the compounds under test was made with graded doses of aspirin.

The invention thus provides therapeutic compositions comprising oxazoline derivatives of formula I described herein.

The invention still further provides therapeutic compositions comprising the aryl alkanoic acids and esters and their pharmaceutically acceptable salts and amides, obtained as described herein.

All the therapeutic compositions comprise a pharmaceutically acceptable diluent or carrier. The compositions preferably contain 0.1 to 90% by weight of the active compounds.

Preferred compositions of the invention are compositions for oral administration, and these are the conventional pharmaceutical forms for such administration, such as for example tablets, capsules, lozenges, powders, effervescent granules, syrups and aqueous and oily suspensions. The excipients used in the preparation of these compositions are the excipients of the pharmacist's art. Thus in the preparation of tablets, typical excipients include disintegrating agents, e.g., maize starch and lubricating agents, e.g. magnesium stearate. In the preparation of capsules, standard gelatin capsules may be used containing the active ingredient alone or admixed with a diluent. The liquid compositions may comprise as excipients water and sucrose to provide syrups, water, dispersing agents and suspending agents, e.g., sodium carboxymethylcellulose to provide aqueous suspensions, and a non-toxic oil, e.g., a vegetable oil such as arachis oil and a suspending agent to provide oily suspensions.

Other preferred compositions of the invention are compositions for rectal administration, and these are the conventional pharmaceutical forms for such administration, such as for example suppositories with fatty glyceride or polyethylene glycol bases.

Compositions for topical use are the conventional pharmaceutical forms for such application, such as ointments, creams and lotions. Ointments and creams may be water miscible or water-immiscible in character and include emulsions prepared from emulsifying waxes and oils and those prepared from water miscible polyethylene glycols. Lotions may comprise a solution in an aliphatic alcohol with 1 – 4 carbon atoms which may contain a small proportion of water.

Compositions for parenteral administration are the conventional pharmaceutical forms for such administration, for example sterile suspensions in aqueous or oily media or sterile solutions in propylene glycol.

In some formulations it may be beneficial to use the compounds of the invention in the form of particles of very small size, such as for example, as obtained by fluid energy milling, e.g., micronizing.

The products of the present invention may of course be employed in combination with other active antiinflammatory agents, analgesics, and antipyretic agents, or with other drugs.

The invention also provides a method of treating inflammatory, painful or feverish conditions in humans or animals which comprises administering a pharmaceutically acceptable dose of the previously described therapeutic compositions.

The optimum dose rate varies with the route of administration, and with the particular compound but normally lies within the range 0.014 – 50 mg. of active compound /kg./day, more usually 0.035 – 35 mg./kg./day. The unit dose of active compound may vary from 0.5 mg. to 500 mg.; for oral administration the dosage rate is preferably 0.5 mg. to 3 g. per subject per day.

The starting materials of formula IV used for preparing the oxazoline derivatives are themselves novel compounds. Preferably $R_c$ and $R_d$ are both alkyl e.g., methyl and $R_b$ is either hydrogen or methyl.

The compounds may be prepared as follows (for the sake of brevity, the term "halo" is used in the following description to indicate "iodo," "bromo" and "chloro"):

a. by reacting a compound of formula

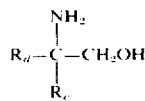

wherein $R_c$ and $R_d$ are as defined above (e.g., 2-amino-2-methylpropan-1-ol or another dialkylethanolamine, or 1-amino-1-hydroxymethyl cyclohexane or 2-amino-2,2-diphenyl-ethanol) with a compound $CF_2=CR_bY$, in which $R_b$ is hydrogen or lower alkyl, preferably methyl, and Y is halo, or with an α-haloalkanoic acid, e.g., 2-halopropionic or haloacetic acid, or its acid halide, anhydride or activated ester hereof, or b. by halogenating a compound of formula IV in which Y is hydrogen.

These processes can be carried out in the presence of an inert organic solvent, e.g., a chlorinated hydrocarbon at a temperature from 0 to 200°C, e.g. at from 15°C up to reflux temperature.

The halogenation may be carried out by treatment, preferably at such a temperature and in such a solvent, with a conventional N-haloamide or N-haloimide halogenating agent in conventional manner. Typical reagents are N-haloacetamides, N-halosuccinimides and N-halophthalimides.

When Y is chlorine, the halogenation may be carried out by treatment with chlorine in a conventional inert solvent such as a chlorinated hydrocarbon e.g., carbon tetrachloride. This generally yields initially a mixture of some of the required product and a number of noncyclic chlorinated products: treatment (e.g., refluxing) of this mixture with solid alkali metal hydroxide in finely-divided form in a non-polar solvent e.g., benzene results in cyclisation of some of the non-cyclic compounds taking place to give good yields of the required compound.

When Y is iodine, the halogenation may be carried out by means of an alkali metal hypoiodite, which is conveniently prepared by mixing iodine, an alkali metal iodide and an alkali metal hydroxide in water. Halogenation may be effected in an organic or aqueous organic solvent, at any suitable temperature, e.g., 10 to 50°C preferably about 20°C.

It will be appreciated that, those compounds of formulae I, II, IV, VI, VII and VIII which possess an asymmetric carbon atom are ordinarily present in the form of a reacemic mixture. The resolution of such racemates may be carried out by any conventional method and the separated optically active stereoisomers form part of the present invention.

The invention is illustrated in the following examples in which parts and percentages are by weight, unless otherwise stated.

EXAMPLE 1

Preparation of
2-[1-(2-fluoro-4-biphenylyl)-ethyl]-4,4-dimethyl-2-oxazoline

A mixture of magnesium (1.7 g.), tetrahydrofuran (10 ml.), a few drops of a solution made by dissolving 4-bromo-2-fluorobiphenyl (17 g.) in tetrahydrofuran (50 ml) and a few drops of bromine were allowed to react for a few minutes. The remainder of the 4-bromo-2-fluorobiphenyl solution was then added with stirring at a rate sufficient to maintain a reaction temperature of 50° – 60°C., and after addition was complete, the reaction mixture was kept at 60°C. for a further 30 minutes. The mixture was then cooled to 0°C. and there was added to it dropwise with stirring 2-(1-bromoethyl)-4,4-dimethyl-2-oxazoline (18.5 g.); the reaction mixture was maintained at 0° – 5°C. during this addition. The resulting mixture was then refluxed for 2 hours, after which time the solvent was evaporated and the residue mixed with water. The product was isolated in ether and distilled to give 2-[1-(2-fluoro-4-biphenylyl)ethyl]-4,4-dimethyl-2-oxazoline, b.p. 166° – 168°C./0.2 mm.

In a similar manner the following 4,4-dimethyl-2-oxazolines are prepared.

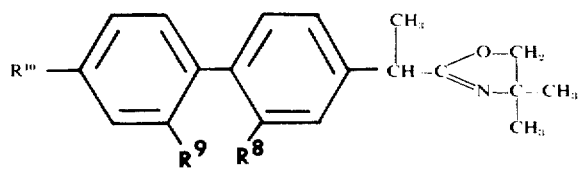

| Example No. | R⁸ | R⁹ | R¹⁰ | B.P.(°C./mm.) | M.P.(°C.) |
|---|---|---|---|---|---|
| 2 | F | H | Cl | 170–174/0.5 | 52–54 |
| 3 | Br | F | F | 160–165/0.5 | liquid |
| 4 | Cl | H | Cl | 182–185/0.5 | 60–62 |
| 5 | Cl | H | F | 164–168/0.5 | 68–70 |
| 6 | MeO | H | F | 155–160/0.15 | 86–87 |
| 7 | F | H | MeO | 206–210/2.5 | 71–73 |
| 8 | F | F | H | 138–142/0.2 | 60–64 |
| 9 | H | F | H | 159–164/0.8 | 67–69 |
| 10 | H | H | F | 154–158/0.3 | 68–72 |
| 11 | MeO | H | H | 167–171/0.5 | 80–83.5 |
| 12 | Me | H | H | 174–178/1.3 | 59.5–62.5 |
| 13 | Cl | H | H | 158–161/0.4 | 64–66 |
| 14 | Br | H | H | 168–171/0.4 | 64–65 |
| 15 | H | H | Cl | 172–174/0.3 | 80–83 |

The following compounds are also prepared in a similar manner.

| Example No. | X | R²⁴ | R²⁵ | B.P.(°C./mm.) | M.P.(°C.) |
|---|---|---|---|---|---|
| 16 | O | H | H | 159–160/0.6 | |
| 17 | O | H | MeO | 198–202/1.0 | |
| 18 | S | H | H | 170–174/0.4 | |
| 19 | S | H | F | 188–192/1.0 | 60–62 |
| 20 | S | H | Cl | 198–200/1.0 | 52–55 |

The following compounds are also prepared in a similar manner.

| Example No. | R²⁶ | R²⁸ | R³⁰ | B.P.(°C./mm.) | M.P.(°C.) |
|---|---|---|---|---|---|
| 21 | H | H | isobutyl | 118–124/0.8 | |
| 22 | CH₃ | H | isobutyl | 108–109/0.4 | |
| 23 | CH₃ | H | cyclohexyl | 147–149/0.6 | 42–45 |
| 24 | CH₃ | Cl | cyclohexyl | 156–158/0.7 | 56–58 |
| 25 | CH₃ | H | alkloxy | 129/0.7 | |
| 26 | CH₃ | H | propylthio | 142–148/1.2 | |
| 27 | H | Cl | H | 83–84/0.7 | |
| 28 | H | F | phenyl | 175–178/2 | 54–58 |

EXAMPLE 29

Preparation of 2-[1-(4-biphenylyl)ethyl]-4,4-dimethyl-2-oxazoline

A solution of n-butyl bromide (6.85 g., 0.05 mole) in dry ether (15 ml.) was added dropwise to a stirred suspension of lithium shot (0.84 g., 0.12 g. atom) in dry ether (25 ml.) under nitrogen. The first few drops were added at room temperature to start the reaction, the remainder of the addition was carried out at −10°C. After the addition, the mixture was stirred at 0° to 10°C. for 2 hours. The ethereal butyl lithium was filtered under nitrogen into a dropping-funnel and added dropwise to a solution of 2-(4-biphenylylmethyl)-4,4-dimethyloxazoline (9.3 g., 0.035 mole) in tetrahydrofuran (50 ml.) under nitrogen at 0° to 5°C. During the addition, the colour of the reaction mixture turned deep red-brown; 30 minutes after the addition, a yellow solid precipitated. The mixture was stirred at room temperature for 4 hours before cooling in ice and adding a solution of methyl iodide (7.1 g., 0.05 mole) in ether (15 ml.), dropwise, at 0° to 2°C. Stirring was continued overnight at room temperature. The dark-red reaction colour lightened to pale brown during this period. A solution of ammonium chloride (10 g.) in water (30 ml.) was added dropwise to the mixture which was cooled in ice and the resulting mixture was extracted with ether/acetone. The extracts were washed with sodium thiosulphate solution, dried, evaporated, and distilled, to give 2-[1-(4-biphenylyl)ethyl]-4,4-dimethyl-2-oxazoline, b.p. 172° – 176°C./1 mm.

EXAMPLE 30

Preparation of 2-(2-fluoro-4-biphenylyl)-propionic acid

Concentrated hydrochloric acid (20 ml.) was added dropwise with stirring to a suspension of 2-[1-(2-fluoro-4-biphenylyl)ethyl]-4,4-dimethyl-2-oxazoline (12 g.) in water (40 ml.). The resulting mixture was then refluxed for 1 hour, cooled and the product isolated in methylene chloride. The methylene chloride solution was extracted with 2.5% aqueous potassium carbonate, the aqueous extract acidified with dilute hydrochloric acid, and the product again isolated in methylene chloride. Evaporation to dryness and recrystallization of the residue from petroleum ether, b.p. 100° – 120°C. gave 2-(2-fluoro-4-biphenylyl)-propionic acid, m.p. 110° – 111°C.

EXAMPLE 31

Preparation of 2-(2-fluoro-4-biphenylyl)-propionic acid

The procedure of Example 1 was followed as far as refluxing for 2 hours the reaction product resulting from mixing the Grignard reagent formed from 4-bromo-2-fluorobiphenyl and 2-(1-bromoethyl)-4,4-dimethyl-2-oxazoline. At this stage, the solvent was evaporated and concentrated hydrochloric acid (20 ml.) was added dropwise with stirring to the residue suspended in water (40 ml.). The resulting mixture was refluxed for 1 hour. The isolation procedure of Example 30 was then followed to give 2-(2-fluoro-4-biphenylyl)propionic acid, m.p. 110° – 111°C.

EXAMPLE 32

In a similar manner to that described in Example 31 the oxazolines of Examples 2 – 28 are hydrolysed to give the corresponding acids, having the melting points as shown in the following Table.

Table

| Oxazoline from Ex. No. | M.P. of acid obtained (°C.) | Oxazoline from Ex. No. | M.P. of acid obtained (°C.) |
|---|---|---|---|
| 2 | 109–110 | 16 | 69–70 |
| 3 | 112–113.5 | 17 | 80–82.5 |
| 4 | 116–118 | 18 | 90–91 |
| 5 | 119–120 | 19 | 98–100 |
| 6 | 133–136 | 20 | 125–127 |
| 7 | 120–122 | 21 | 85.5–87.5 |
| 8 | 121–123 | 22 | 75–77.5 |
| 9 | 94.5–97 | 23 | 110.5–122.5 |
| 10 | 151–153 | 24 | 77–81 |
| 11 | 120–122 | 25 | 47.5–49 |
| 12 | 104–106 | 26 | liquid (B.P. 158–160/0.2mm.) |
| 13 | 134–135 | | |
| 14 | 138–139 | 27 | 74.5–76.5 |
| 15 | 175–176 | 28 | 143–144 |

EXAMPLE 33

Preparation of
2-(1-bromoethyl)-4,4-dimethyl-2-oxazoline

N-Bromosuccinimide (35.6 g.) was added portionise during 2 hours to a stirred, refluxing solution of ethyl-4,4-dimethyl-2-oxazoline (25.5 g.) in carbon tetrachloride (200 ml.). Refluxing with stirring was continued for a further 5 hours, the mixture was cooled, and the precipitated succinimide was removed by filtration. The filtrate was evaporated and the residue distilled to give 2-(1-bromoethyl)-4,4-dimethyl-2-oxazoline, b.p. 73°–74°C./10 mm.

EXAMPLE 34

Preparation of
2-(1-iodoethyl)-4,4-dimethyl-2-oxazoline

A solution of iodine (50.8 g.), potassium iodide (31.6 g.) and potassium hydroxide (22.5 g.) in water (200 ml.) was mixed with a solution of 2-ethyl-4,4-dimethyl-oxazoline (25.5 g.) in methylene chloride (150 ml.). The resulting mixture was stirred vigorously overnight, and then the methylene chloride layer was separated and evaporated. Distillation of the residue gave 2-(1-iodoethyl)-4,4-dimethyl-2-oxazoline, b.p. 78°–80°C./6 mm.

EXAMPLE 35

Preparation of 4-bromo-2-fluorobiphenyl

4-Bromo-2-fluorobiphenyl was prepared as follows. 4-Amino-4-bromobiphenyl (32.5 g.) in tetrahydrofuran (38 ml.) was cooled to 5°C. and hydrofluoroboric acid (117 ml. of 42%) was added portionwise. To the slurry so obtained there was added dropwise with stirring sodium nitrite (10.3 g.) in water (15.6 ml.), the reaction mixture being maintained below 5°C. After stirring for a further hour, the diazonium fluoroborate was collected, washed with hydrofluoroboric acid (100 ml. of 5%), methanol/ether (100 ml.; 1:4), and ether and was then dried in vacuo. The solid so obtained suspended in xylene (230 ml.) was warmed until decomposition commenced and was then refluxed for 15 minutes. After cooling, the reaction mixture was poured on to iced dilute sodium hydroxide solution. The xylene layer was separated, the xylene removed by distillation, and the residue distilled to give 4-bromo-2-fluorobiphenyl, b.p. 106°–109°C./0.6 mm.

EXAMPLE 36

No. 5 hard gelatin capsules are prepared each containing the following.

| | |
|---|---|
| (a) 2-[1-(2-fluoro-4-biphenylyl)ethyl]-4,4-dimethyl-2-oxazoline | 5 mg. |
| lactose | 95 mg. |
| (b) 2-[1-(2-fluoro-4-biphenylyl)ethyl]-4,4-dimethyl-2-oxazoline | 5 mg. |
| calcium phosphate | 5 mg. |
| maize starch | 90 mg. |

EXAMPLE 37

The following mixture was formed into tablets in conventional manner, each tablet containing 5 mg. of active ingredient.

| | Parts |
|---|---|
| 2-[1-(2-fluoro-4-biphenylyl)ethyl]-4,4-dimethyl-2-oxazoline | 5 |
| maize starch | 30 |
| lactose | 164 |
| magnesium stearate | 1 |

EXAMPLE 38

Suppositories weighing 1 g. and containing 5 mg. of 2-[1-(2-fluoro-4-biphenylyl)ethyl]-4,4-dimethyl-2-oxazoline are prepared in a conventional manner using a base consisting of

| | | |
|---|---|---|
| polyethylene glycol | 4000 | 33% |
| polyethylene glycol | 600 | 47% |
| water | | 20% |

Compositions similar to those described in Examples 36 to 38 are prepared containing as active ingredient other compounds of the invention.

EXAMPLE 39

Preparation of
2-(1-bromoethyl)-4,4-dimethyl-2-oxazoline

A solution of 2-bromopropionyl bromide (90 g.) in methylene chloride (200 ml.) was added dropwise with stirring to a solution of 2-amino-2-methylpropan-1-ol (35 g.) in methylene chloride (200 ml.) at −5°C. over a period of 2 hours. Stirring was continued for another one half hour and the white solid which formed (hydrobromide of the aminoalcohol) was filtered off. The filtrate was evaporated and benzene (50 ml.) was added to the residue. The mixture was then refluxed with azeotropic removal of water for 20 hours. Benzene was distilled off and the residue distilled to give 2-(1-bromoethyl)-4,4-dimethyl-2-oxazoline, b.p. 73°–74°C./10 mm.

I claim:

1. Compounds having the formula

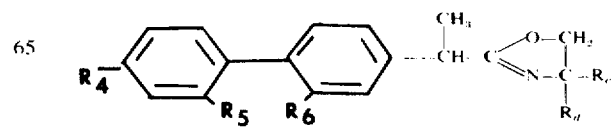

in which $R_4$ is hydrogen, $R_5$ is hydrogen or fluorine, $R_6$ is fluorine and $R_c$ and $R_d$ are the same or different and are $C_1-C_7$ alkyl.

2. Compounds according to claim 1 wherein $R_c$ and $R_d$ are methyl.

3. 2-(1-(2,2'-difluoro-4-biphenylyl)ethyl)-4,4-dimethyl-2-oxazoline.

4. 2-(1-(2-fluoro-4-biphenylyl) ethyl)-4,4-dimethyl-2-oxazoline.

* * * * *